United States Patent
Li et al.

(10) Patent No.: US 10,644,991 B2
(45) Date of Patent: May 5, 2020

(54) CLUSTER COMMUNICTAION

(71) Applicant: NEW H3C TECHNOLOGIES CO., LTD, Hangzhou, Zhejiang (CN)

(72) Inventors: Sijie Li, Beijing (CN); Xi Jiang, Beijing (CN); Jianbin Bu, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 30 days.

(21) Appl. No.: 15/745,884

(22) PCT Filed: Sep. 30, 2016

(86) PCT No.: PCT/CN2016/101143
§ 371 (c)(1),
(2) Date: Jan. 18, 2018

(87) PCT Pub. No.: WO2017/054770
PCT Pub. Date: Apr. 6, 2017

(65) Prior Publication Data
US 2018/0198702 A1    Jul. 12, 2018

(30) Foreign Application Priority Data

Sep. 30, 2015 (CN) .......................... 2015 1 0640509

(51) Int. Cl.
*H04L 12/703* (2013.01)
*H04L 12/751* (2013.01)
(Continued)

(52) U.S. Cl.
CPC .............. *H04L 45/28* (2013.01); *H04L 45/02* (2013.01); *H04L 45/025* (2013.01); *H04L 45/22* (2013.01); *H04L 45/46* (2013.01); *H04L 49/252* (2013.01)

(58) Field of Classification Search
CPC ....... H04L 45/28; H04L 45/02; H04L 45/025; H04L 45/22; H04L 45/46; H04L 49/252
(Continued)

(56) References Cited

U.S. PATENT DOCUMENTS 7,818,408 B1 * 10/2010 Ignatuk ............... G06F 11/2033
370/252
9,019,814 B1    4/2015 Mohanty et al.
(Continued)

FOREIGN PATENT DOCUMENTS

CN    101488918 A    7/2009
CN    102821044 A    12/2012
(Continued)

OTHER PUBLICATIONS

H3C, Table of Contents BGP Configuration. 76 pages. Sep. 29, 2011.
(Continued)

*Primary Examiner* — Obaidul Huq
(74) *Attorney, Agent, or Firm* — McCarter & English, LLP; Kia L. Freeman; Thomas R. Foley

(57) ABSTRACT

The server may be configured with two or more than two network cards. The server may advertise a route, which may comprise a network segment address of each local network card and an IP address of the server, to a route neighbor of the server via the each local network card. The server may receive route information, which may comprise an address of a device, from the route neighbor of the server via the each network card. The server may determine a route from the server to the device. An outgoing port of the route may be the each network card. When a packet destined for the address of the device is received, the server may forward the packet via the route. When a link connecting to a network (Continued)

card fails, the server may disable all the routes, outgoing interfaces of which may be the network card.

15 Claims, 3 Drawing Sheets

(51) Int. Cl.
  *H04L 12/707* (2013.01)
  *H04L 12/715* (2013.01)
  *H04L 12/947* (2013.01)
(58) Field of Classification Search
  USPC .......................................... 370/216, 217, 218
  See application file for complete search history.

(56) References Cited

U.S. PATENT DOCUMENTS

| | | | | |
|---|---|---|---|---|
| 2002/0120761 | A1* | 8/2002 | Berg | H04L 29/06 709/230 |
| 2002/0156888 | A1* | 10/2002 | Lee | H04L 41/0856 709/224 |
| 2003/0035408 | A1* | 2/2003 | Hebert | H04L 41/0663 370/349 |
| 2005/0246568 | A1* | 11/2005 | Davies | G06F 11/0709 714/2 |
| 2009/0049173 | A1 | 2/2009 | Pulito et al. | |
| 2009/0271412 | A1* | 10/2009 | Lacapra | H04L 67/104 |
| 2010/0082822 | A1 | 4/2010 | Yamazaki | |
| 2010/0232300 | A1 | 9/2010 | Kashima | |
| 2014/0204761 | A1* | 7/2014 | Durrani | H04L 47/41 370/236 |

FOREIGN PATENT DOCUMENTS

| | | |
|---|---|---|
| CN | 103095600 A | 5/2013 |
| CN | 104486124 A | 4/2015 |
| JP | 2010081496 A | 4/2010 |
| JP | 2010213041 A | 9/2010 |
| JP | 2014183549 A | 9/2014 |

OTHER PUBLICATIONS

Sajassi et al., BGP MPLS-based Ethernet VPN. Internet Engineering Task Force (IETF), Request for Comments: 7432, Category: Standards Track. 56 pages. Feb. 2015.

* cited by examiner

CLUSTER COMMUNICTAION

RELATED APPLICATIONS

This application is a 35 U.S.C. § 371 national stage filing of International Application No. PCT/CN2016/101143, filed on Sep. 30, 2016, which claims the benefit of priority from a Chinese Patent Application, No. 201510640509.7, entitled "Method and server for implementing a cluster" and filed on Sep. 30, 2015. The entire contents of each of the foregoing applications are hereby incorporated by reference.

BACKGROUND

In a cluster, a server in the cluster advertises an IP address of a network card (called a network card IP address for short) on the server. After other servers in the same cluster and/or network devices, such as switches, which do not belong to the cluster, receive the network card IP address, the servers and/or the switches may compute an optimal route to the network card IP address and send data stream to the network card IP address using the optimal route.

DETAILED DESCRIPTION

Figure 1:
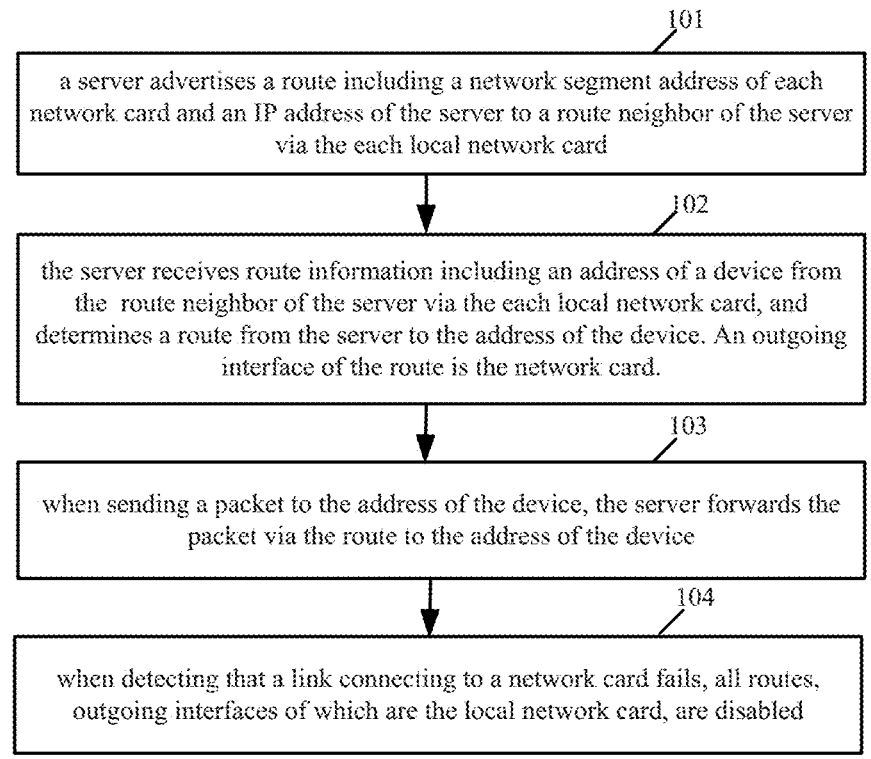
FIG. 1 is a flow chart illustrating a method according to an example of the present disclosure.

For simplicity and illustrative purposes, the present disclosure is described by referring to examples. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

A cluster may be formed by server 1 to server 5. Each of the server 1 to server 5 may be configured with one network card and the network cards on the server 1 to server 5 may be configured with different IP addresses. The server 1 and server 2 may connect to the switch 1 via their local network cards and the server 3 to server 5 may connect to the switch 2 via their local network cards. The switch 1 may connect to the switch 2. Taking the server 1 for example, the server 1 may advertise its local network IP address. After receiving the network card IP address, the switch 1 and server 2 may compute the optimal routes to the network card IP address according to a route protocol. When receiving data stream destined for the network card IP address, the switch 1 and server 2 may transmit the data stream according to the optimal route to the network card IP address. A local network card may be a physical network card or logic network card configured on a device, such as a server.

In the network, link failure may occur, such as the switch 1 may fail. When the switch 1 fails, the server 1 and server 2 may not work due to the failure of the switch 1, which may affect the usability of the cluster.

A method provided by an example may include blocks shown in FIG. 1.

Referring to FIG. 1, FIG. 1 is a flow chart illustrating a method according to an example of the present disclosure. The method may be applied to any server in a cluster. As shown in FIG. 1, the flow may include following blocks.

At block 101, a server may advertise a route including a network segment address of each network card and an IP address of the server to a route neighbor of the server via the each network card.

Figure 2:
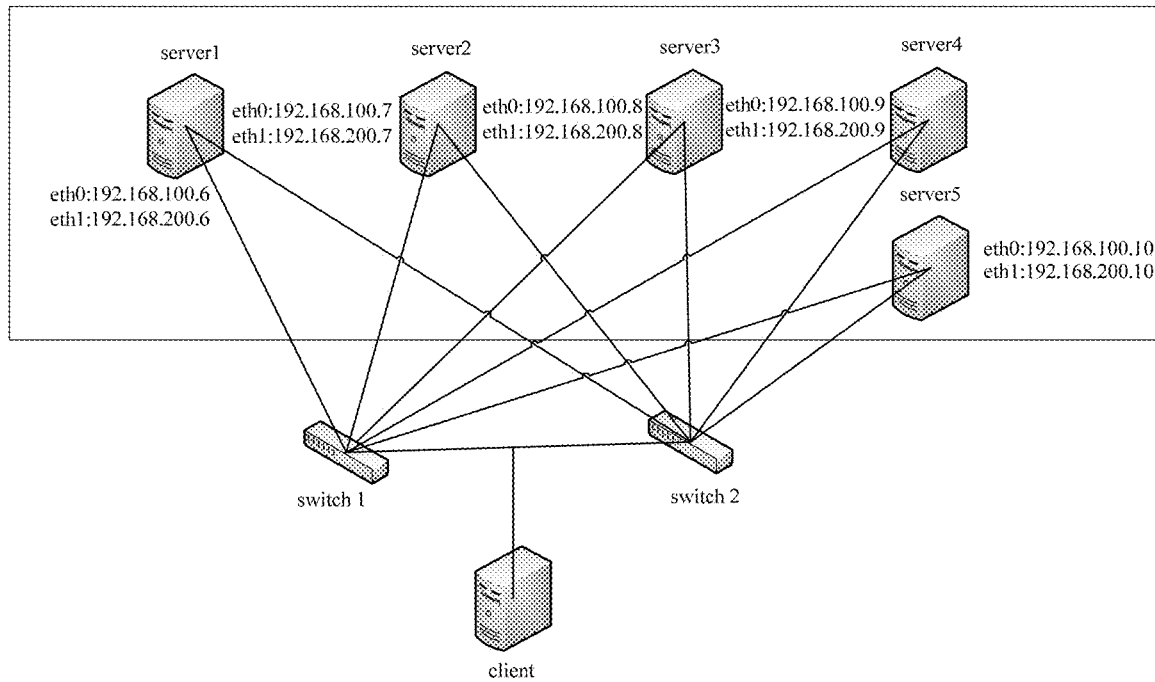
FIG. 2 is a diagram illustrating a network according to an example of the present disclosure.

The number of network cards configured for each server in the same cluster may be the same or different. No matter whether the number of the network cards configured for the each server in the same cluster may be the same, two or more than two network cards may be configured for the each server. In an example, the IP addresses of different network segments may be configured for each network card on a server. An IP address of a network card may be called a network card IP address for short. Server 1 in a cluster shown in FIG. 2 may be configured with two network cards, i.e., eth0 and eth1. The network card IP address of the eth0 may belong to network segment 192.168.100.x and the network card IP address of the eth1 may belong to network segment 192.168.200.x. The network card IP address of the eth0 and the network card IP address of the eth1 may respectively belong to different network segments.

In this example, different local network cards on the server may connect to different route switch devices. Taking the server 1 in FIG. 2 for example, the eth0 on the server 1 may connect to the switch 1 and the eth1 on the server may connect to the switch 2.

As described at block 101, after the network cards are configured for the server, the server may advertise two routes to the route neighbor via each local network card. The two routes may include a route including a segment address of the network card and a route including an IP address of the server. Two examples may be given hereinafter to describe how to advertise, by the server, the route to the route neighbor of the server via the each local network card.

In this example, the IP address of the server may have a Loopback interface attribute. The Loopback may be a logic interface (a virtual interface). The Loopback interface attribute may be that a state of the Loopback interface may keep up except that the server fails. In this example, the IP address of the server may be configured via following modes: configuring a sub-interface for the Loopback interface on the server and configuring the IP address of the sub-interface as the IP address of the server.

As for the IP address of the Loopback interface, it may be configured as a default IP address, i.e., 127.0.0.1/8.

After other devices receive the IP address of the server, the other devices may establish routes with the IP address of the server. For instance, after the server advertises the IP address of the server and the network card IP address, i.e., advertises a route of the network segment address of the network card and a route of the IP address of the server, when a switch receives the IP address of the server and the network card IP address, the external device may determine a route to the IP address of the server and determine that a next hop of the route to the IP address of the server may be the network card IP address. An external device may be a device with a routing and switching function, may be a part of a network, and may be used to assist a server in providing a service to another device, such as a client device.

At block 102, the server may receive route information including an address of a device from the route neighbor of the server via the each local network card, and determine a route from the server to the address of the device. An outgoing interface of the route may be the network card. The outgoing interface may refer to an interface on the server for sending data stream from the server to the other devices.

At block 102, the address of the device may include: an IP address of a client or an IP address of other server in the same cluster. Examples may be given hereinafter to describe receiving route information including the address of the device from the route neighbor of the device via the each local network card.

At block 102, the IP address of the client or the IP addresses of the other server in the same cluster may be received via different network cards. How many different routes from the server to the above addresses, such as the IP address of the client or the IP address of the other server in the same cluster may be determined.

At block 102, when the address of the device is the IP address of the other server in the same cluster, the server may interact with the other server in the same cluster. Since the number of the network cards configured on the server is larger than one, the routes for interacting the server and the other server in the same cluster may be more than one. When the address of the other device is the IP address of the client, the server may interact with the client. Since the number of the network cards configured on the server is larger than one, the routes for interacting the server and the client may be more than one.

The client may be a user accessing the server.

At block 103, when sending a packet to the address of the device, the server may forward the packet via one route to the address of the device.

In an example, the one route may be one of routes from the multiple network cards configured on the server to the address of the device.

As an example, at block 103, when there are multiple routes to the addresses of other devices, the server may select one route from the multiple routes according to a preconfigured local route strategy and forward the packet via the selected route. The route strategy may include a shortest path algorithm and a Hash algorithm, etc., which may not be limited in this disclosure.

At block 104, when detecting that a link to a local network card fails, all routes, outgoing interfaces of which may be the local network card, may be disabled. In an example, all routes, the outgoing interfaces of which may be the local network card, may be deleted and all route information received via the local network card may be deleted. In another example, invalid tags may be set for all routes, the outgoing interfaces of which may be the local network card, so that all routes, the outgoing interfaces of which may be the local network card, may be disabled.

When the link connecting to the local network card fails, the routes, outgoing interfaces of which may be the local network card, may be unreachable.

An example describing deleting all routes, the outgoing interfaces of which may be the local network card, may be given hereinafter. As described at block 101, after receiving the IP address of the server, other devices may generate routes to the IP address of the server. When a link connecting to a local network card fails, the server may detect that the link connecting to the local network card fail, the server may delete all the routes, the outgoing interfaces of which may be the local network card and delete all route information received from the local network card, without affecting the routes to other network cards. Since the server is configured with multiple network cards, route switching (deleting the route is one route switching mode) may not change the IP address of the server, not affect services in the cluster, and not change internal configurations of the cluster, which may enhance the usability of the cluster. The mode of setting the invalid tags for all the routes, the outgoing interfaces of which may be local network card, also may not change the IP address of the server, not affect services in the cluster, and not change internal configurations of the cluster, which may enhance the usability of the cluster.

The flow shown in FIG. 1 may be described hereinafter with two examples.

Taking the BGP for example, at block 101, the method for advertising the route of the network segment address of the network card and the route of the IP address of the server to the route neighbor via the each local network card may include:

b1: as for each local network card, a BGP neighbor connection between the network card and a route switch device connecting to the network card, called a BGP neighbor, may be established. The network segment route of the network card and route of the IP address of the server may be sent to the BGP neighbor. The next hop of the network segment route of the network card may be the network card IP address of the network card and the next hop of the route of the IP address of the server may be the network card IP address of the network card.

At block 102, the method for receiving the route information including the address of the device from the route neighbor of the device via the each local network card may include:

c1: a BGP route advertised by a BGP neighbor connecting to the each network card may be received via the each network card.

An example may be given hereinafter.

Suppose that a BGP neighbor connection is an External Border Gateway Protocol (EBGP). Taking the BGP application networking shown in FIG. 3 for example, FIG. 3 may show two servers, i.e., server 1 (denoted with 1.1.1.1/32) and server 2 (denoted with 2.2.2.2/32). The IP address 1.1.1.1 of the server 1 may be the IP address of a sub-interface configured for the Loopback interface on the server 1. The server 1 may be configured with a network card eth0 (denoted with 192.168.56.76/24) and a network card eth1 (denoted with 192.168.55.76/24). The IP address 2.2.2.2 of the server 2 may be the IP address of a sub-interface configured for the Loopback interface on the server 2. The server 2 may be configured with a network card eth3 (denoted with 192.168.54.76/24) and a network card eth4 (denoted with 192.168.53.76/24). The IP address of the network card eth3 may be 192.168.54.76 and the IP address of the eth4 may be 192.168.53.76.

Figure 3:
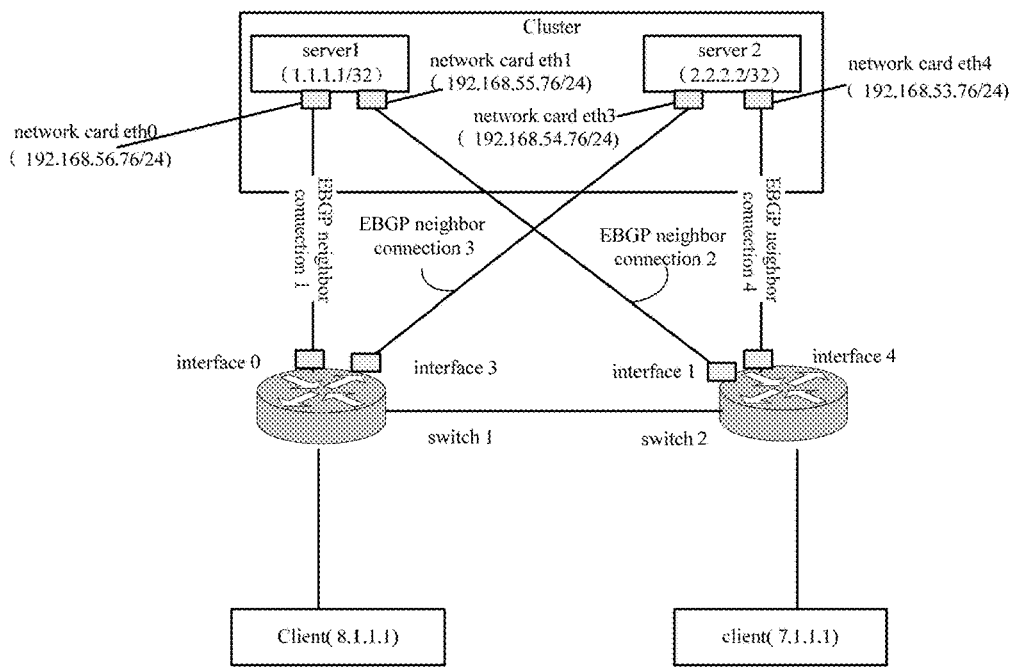
FIG. 3 is a diagram illustrating networking of a Broader Gateway Protocol (BGP) application according to an example of the present disclosure.

In FIG. 3, the EBGP neighbor connection (denoted with EBGP neighbor connection 1) between the eth0 on the server 1 and the interface 0 on the switch 1 may be established. The EBGP neighbor connection (denoted with EBGP neighbor connection 2) between the eth1 on the server 1 and the interface 1 on the switch 2 may be established. The network segment route of the network card eth0 may be recorded as route 0 and the next hop of the route 0 may be the IP address 192.168.56.76 of the network card eth0. The network segment route of the network card eth1 may be recorded as route 1 and the next hop of the route 1 may be the IP address 192.168.55.76 of the network card eth1.

In FIG. 3, the EBGP neighbor connection (denoted with EBGP neighbor connection 3) between the eth3 on the server 2 and the interface 3 on the switch 1 may be established. The EBGP neighbor connection (denoted with EBGP neighbor connection 4) between the eth4 on the server 2 and the interface 4 on the switch 2 may be established. The network segment route of the network card eth3 may be recorded as route 3 and the next hop of the route 3 may be the IP address 192.168.54.76 of the network card eth3. The network segment route of the network card eth4 may be recorded as route 4 and the next hop of the route 4 may be the IP address 192.168.53.76 of the network card eth4.

In FIG. 3, the server 1 may send the network segment route, i.e., a route 0 and a first route of the IP address 1.1.1.1 of the server (denoted with a route 01) to the switch 1 via the EBGP neighbor connection 1. The next hop of the route 01 may be the IP address 192.168.56.76 of the network card eth0. The server 1 may send a network segment route, i.e., a route 1 and a second route of the IP address 1.1.1.1 of the server (denoted with a route 02) to the switch 2 via the EBGP neighbor connection 2. The next hop of the route 02 may be the IP address 192.168.55.76 of the network card eth1. The server 1 may send the route of the network segment address of the each local network card and the IP address of the server to the route neighbors of the server 1 via the each local network card.

In FIG. 3, the server 2 may send the network segment route, i.e., a route 3 and a first route of the IP address 2.2.2.2 of the server (denoted with a route 03) to the switch 1 via an EBGP neighbor connection 3. The next hop of the route 03 may be the IP address 192.168.54.76 of the network card eth3. The server 2 may send the network segment route, i.e., a route 4 and a second route of the IP address 2.2.2.2 of the server (denoted with a route 04) to the switch 2 via an EBGP neighbor connection 4. The next hop of the route 04 may be the IP address 192.168.53.76 of the network card eth4. The server 2 may send a route of the network segment address of the each local network card and the IP address of the server to route neighbors of the server 2 via the each local network card.

In FIG. 3, after receiving the route 0 and route 01 advertised by the server 1, the switch 1 may learn a route to the server 1 (denoted with a route A1) according to route learning. The IP address of the learned route A1 may be the IP address 1.1.1.1 of the server1 of the route 01 and the next hop of the learned route A1 may be the IP address 192.168.56.76 of the network card eth0.

After receiving the route 1 and route 02 advertised by the server 1, the switch 2 may learn a route to the server 1 (denoted with a route B1) according to route learning. The IP address of the learned route B1 may be the IP address 1.1.1.1 of the server1 of the route 02 and the next hop of the learned route B1 may be the IP address 192.168.55.76 of the network card eth1.

After receiving the route 3 and route 03 advertised by the server 2, the switch 1 may learn a route to the server 2 (denoted with a route A2) according to route learning. The IP address of the learned route A2 may be the IP address 2.2.2.2 of the server 2 of the route 03 and the next hop of the learned route A2 may be the IP address 192.168.54.76 of the network card eth3.

After receiving the route 4 and route 04 advertised by the server 2, the switch 2 may learn a route to the server 2 (denoted with a route B2) according to route learning. The IP address of the learned route B2 may be the IP address 2.2.2.2 of the server 2 of the route 04 and the next hop of the learned route B2 may be the IP address 192.168.53.76 of the network card eth4.

In FIG. 3, the switch 1 and switch 2 may be configured with reflectors. In an example, devices may be configured with reflectors, which may be used to synchronize routes on a local device to a reflector on another device.

The switch 1 may reflect locally-learned route A1, route A2, client route A0 (i.e., a route to client 8.1.1.1) to the switch 2. When the switch 1 reflects the route A1, the next hop of the route A1 may be modified as the IP address of an interface on the switch 1 connecting to the switch 2 according to the BGP. Similarly, the switch 1 also may modify the next hop of the route A2 and route A0 as the IP address of an interface on the switch 1 connecting to the switch 2.

The switch 2 may reflect locally-learned route B1, route B2, client route B0 (i.e., a route to client 7.1.1.1) to the switch 1. When the switch 2 reflects the route B1, the next hop of the route B1 may be modified as the IP address of an interface on the switch 2 connecting to the switch 1 according to the BGP. Similarly, the switch 2 also may modify the next hop of the route B2 and route B0 as the IP address of an interface on the switch 2 connecting to the switch 1.

In FIG. 3, when the switch 1 advertises the route to the server 1 via the EBGP neighbor connection 1, the switch 1 may advertise the locally-learned route A2, route A0 (i.e., the route to client 8.1.1.1), the route B2 and route B0 to the server 1. The route B2 and route B0 may be reflected from the switch 2. When the switch 1 advertises the route A2, the next hop of the route A2 may be modified as an interface IP address of a local interface 0 according to the BGP. Similarly, the switch 1 also may modify the next hop of the route A0, route B2 and the route B0 as the interface IP address of the local interface 0. When the switch 2 advertises the route to the server 1 via the EBGP neighbor connection 2, the switch 2 may advertise the locally-learned route B2, route B0 (i.e., the route to client 7.1.1.1), the route A2 and route A0 to the server 1. The route A2 and route A0 may be reflected from the switch 1. When the switch 2 advertises the B2, the next hop of the route B2 may be modified as an interface IP address of a local interface 1 according to the BGP. Similarly, the switch 2 also may modify the next hop of the route B0, route A2 and the route A0 as the interface IP address of the local interface 1. Therefore, the server 1 may receive the route information including addresses of other devices sent from the route neighbors of the server 1 via the each network card.

When the switch 1 advertises the route to the server 2 via the EBGP neighbor connection 3, the switch 1 may advertise the locally-learned route A1, route A0 (i.e., the route to client 8.1.1.1), the route B and route B0 to the server 2. The route B1 and route B0 may be reflected from the switch 2. When the switch 1 advertises the route A1, the next hop of the route A1 may be modified as an interface IP address of a local interface 3 according to the BGP. Similarly, the switch 1 also may modify the next hop of the route A0, route B1 and the route B0 as the interface IP address of the local interface 3. Therefore, the server 2 may receive the route information including addresses of other devices from route neighbors of the server 2 via each local network card. When the switch 2 advertises the route to the server 2 via the EBGP neighbor connection 4, the switch 2 may advertise the locally-learned route B1, route B0 (i.e., the route to client 7.1.1.1), the route A1 and route A0 to the server 2. The route A1 and route A0 may be reflected from the switch 1. When the switch 2 advertises the route B1, the next hop of the route B1 may be modified as an interface IP address of a local interface 4 according to the BGP. Similarly, the switch 2 also may modify the next hop of the route B0, route A1 and the route A0 as the interface IP address of the local interface 4. Therefore, the server 2 may receive the route information including addresses of other devices sent from the route neighbors of the server 2 via the each local network card.

In view of the above, the server 1 may store two routes from the server 1 to the server 2. The IP addresses of the two routes may be the same, which may be the IP address 2.2.2.2 of the server 2. Outgoing interfaces of the two routes may be different. One of the outgoing interfaces may be the network card eth0 and the other may be the network card eth1. The server 1 may store two routes from the server 1 to the client 8.1.1.1. The IP addresses of the two routes may be the same, which may be the IP address 8.1.1.1 of the client. Outgoing interfaces of the two routes may be different. One of the outgoing interfaces may be the network card eth0 and the other may be the network card eth1. The server 1 may store two routes from the server 1 to the client 7.1.1.1. The IP addresses of the two routes may be the same, which may be the IP address 7.1.1.1 of the client. Outgoing interfaces of the two routes may be different. One of the outgoing interfaces may be the network card eth0 and the other may be the network card eth1.

Similarly, the server 2 may store two routes from the server 2 to the server 1. The IP addresses of the two routes may be the same, which may be the IP address 1.1.1.1 of the server 1. Outgoing interfaces of the two routes may be different. One of the outgoing interfaces may be the network card eth3 and the other may be the network card eth4. The server 2 may store two routes from the server 2 to the client 8.1.1.1. The IP addresses of the two routes may be the same, which may be the IP address 8.1.1.1 of the client. Outgoing interfaces of the two routes may be different. One of the outgoing interfaces may be the network card eth3 and the other may be the network card eth4. The server 2 may store two routes from the server 2 to the client 7.1.1.1. The IP addresses of the two routes may be the same, which may be the IP address 7.1.1.1 of the client. Outgoing interfaces of the two routes may be different. One of the outgoing interfaces may be the network card eth3 and the other may be the network card eth4.

Taking the server 1 for example, when the server 1 receives a packet destined for the client 8.1.1.1, the server 1 may select one route, such as a route, the outgoing interface of which may be the network card eth0, and transmit the packet using the selected route.

When the server 1 detects that the link connecting to the eth0 fails, the server 1 may delete the routes, the outgoing interfaces of which may be the network card eth0 and delete all route information received via the network card eth0. The server 1 may not advertise a message indicating deleting routes, outgoing interfaces of which may be the network card eth0. When detecting that an interface of the switch 1 connecting to the other switch device or clients fails, the other switch devices or clients may adaptively adjust the routes, so as not to forward the packet to the failed interface of the switch 1. After the interface of the switch 1 fails, when the server 1 receives another packet destined for the client 8.1.1.1, the server 1 may transmit the packet via the route, the outgoing interface of which may be the network card eth1.

In another example, the route protocol may be the OSPF. In this example, network cards on all servers in the cluster and interfaces on the route switch devices connecting to the network cards may be in a same OSPF domain.

At block 101, the method for advertising the route of the network segment address of the network card and the IP address of the server to the route neighbor of the device via the each local network card may include:

d1: As for the each local network card, an OSPF neighbor connection between the network card and the route switch device connecting to the network card may be established. The network segment route of the network card and route of the IP address of the server may be advertised to the OSPF neighbor. The next hop of the network segment route of the network card may be the network card IP address of the network card. The next hop of the route of the IP address of the server may be the network card IP address of the network card.

At block 102, the method for receiving the route information including the address of the other device from the route neighbor of the device via the each local network card may include:

e1: The route advertised by the each OSPF neighbor connecting to the each local network card may be received via the each local network card.

An example may be given hereinafter.

Figure 4:
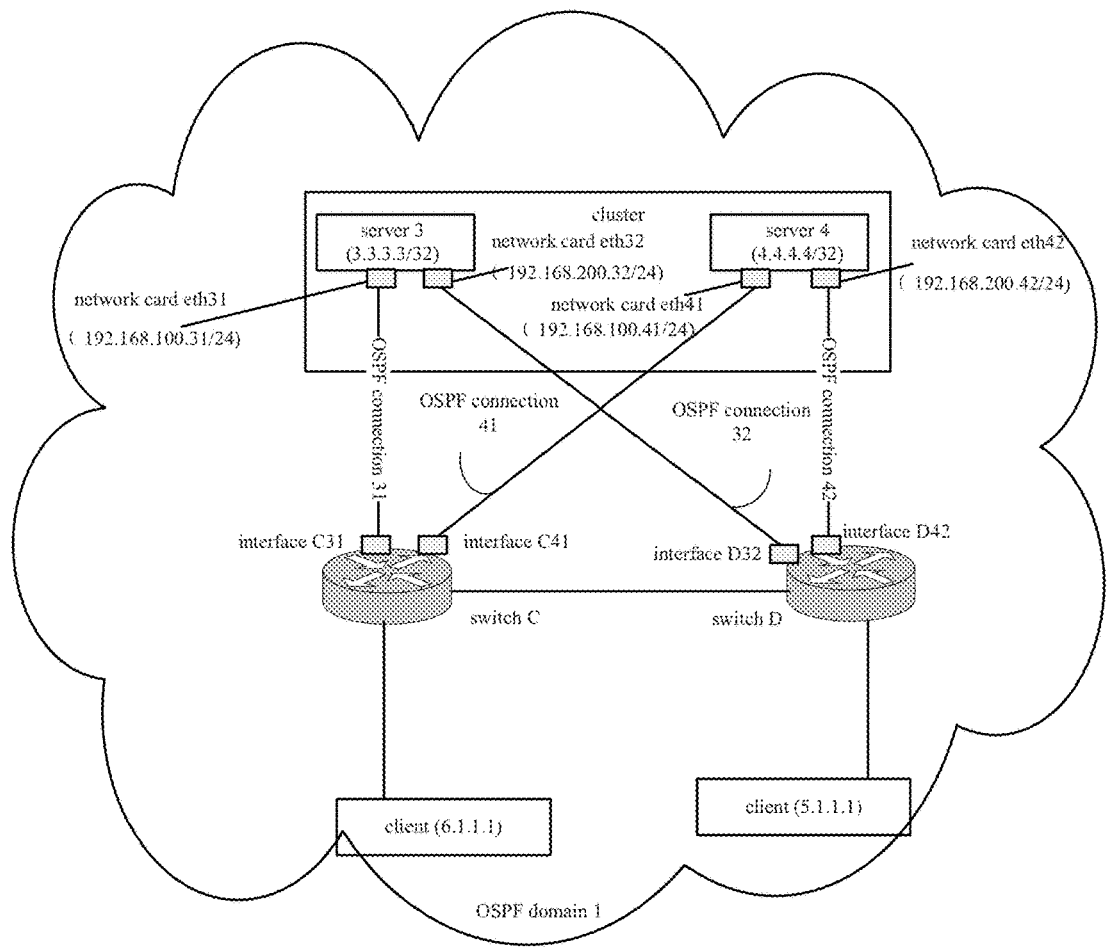
FIG. 4 is a diagram illustrating networking of an Open Shortest Path First (OSPF) application according to an example of the present disclosure.

Taking the OSPF application networking shown in FIG. 4 for example, two servers, i.e., server 3 (denoted with 3.3.3.3/32) and server 4 (denoted with 4.4.4.4/32) in a cluster may be shown in FIG. 4. The IP address 3.3.3.3 of the server 3 may be an IP address of a sub-interface configured for a Loopback interface on the server 3. Two network cards, i.e., network card eth31 (denoted with 192.168.100.31/24) and network card eth32 (denoted with 192.168.200.32/24) may be configured on the server 3. The IP address of the network card eth31 may be 192.168.100.31, and the IP address of the network card eth32 may be 192.168.200.32. The IP address 4.4.4.4 of t server 4 may be an IP address of a sub-interface configured for a Loopback interface on the server 4. Two network cards, i.e., network card eth41 (denoted with 192.168.100.41/24) and network card eth42 (denoted with 192.168.200.42/24) may be configured on the server 4. The IP address of the network card eth41 may be 192.168.100.41, and the IP address of the network card eth42 may be 192.168.200.42.

In FIG. 4, the network card eth31 on the server 3 may connect to an interface C31 on a switch C, a network card eth32 on the server 3 may connect to an interface D32 on a switch D, a network card eth41 on the server 4 may connect to an interface C41 on a switch C and a network card eth42 on the server 4 may connect to an interface D42 on the switch D. The interface C31, interface D32, interface C41 and interface D42 may belong to a same OSPF domain, denoted with an OSPF domain 1.

In FIG. 4, an OSPF neighbor connection (denoted with OSPF neighbor connection 31) between the network card eth31 on the server 3 and the interface C31 on the switch C may be established. An OSPF neighbor connection (denoted with OSPF neighbor connection 32) between the network card eth32 on the server 3 and the interface D32 on the switch D may be established. An OSPF neighbor connection (denoted with OSPF neighbor connection 41) between the network card eth41 on the server 4 and the interface C41 on the switch C may be established. An OSPF neighbor connection (denoted with OSPF neighbor connection 42) between the network card eth42 on the server 4 and the interface D42 on the switch D may be established.

In FIG. 4, a network segment route of the network card eth31 may be denoted with a route 31 and a next hop of the route 31 may be an IP address 192.168.100.31 of the network card eth31. A network segment route of the network card eth32 may be denoted with a route 32 and a next hop of the route 32 may be an IP address 192.168.200.32 of the network card eth32. A network segment route of the network card eth41 may be denoted with a route 41 and a next hop of the route 41 may be an IP address 192.168.100.41 of the network card eth41. A network segment route of the network card eth42 may be denoted with a route 42 and a next hop of the route 42 may be an IP address 192.168.200.42 of the network card eth42.

In FIG. 4, the server 3 may advertise the route 31 and a first route (denoted with a route 33) of the IP address 3.3.3.3 of the server 3 in the OSPF1 domain via the OSPF neighbor connection 31 and the next hop of the route 33 may be the IP address 192.168.100.31 of the network card eth31. The server 3 may advertise the route 32 and a second route (denoted with a route 34) of the IP address 3.3.3.3 of the server 3 in the OSPF1 domain via the OSPF neighbor connection 32 and the next hop of the route 34 may be the IP address 192.168.200.32 of the network card eth32. Therefore, the server 3 may advertise the route including the network segment address of the each local network card and the IP address of the server to the route neighbors of the server 3 via the each local network card.

The server 4 may advertise the route 41 and a first route (denoted with route 43) of the IP address 4.4.4.4 of the server 4 in the OSPF1 domain via the OSPF neighbor connection 41 and the next hop of the route 43 may be the IP address 192.168.100.41 of the network card eth41. The server 4 may advertise the route 42 and a second route (denoted with route 44) of the IP address 4.4.4.4 of the server 4 in the OSPF1 domain via the OSPF neighbor connection 42 and the next hop of the route 44 may be the IP address 192.168.200.42 of the network card eth42. Therefore, the server 4 may advertise the route including the network segment address of the each local network card and the IP address of the server to the route neighbors of the server 4 via the each local network card.

In FIG. 4, the switch C may receive the route 31 and route 33 advertised by the server 3, learn the route to the server 3 (denoted with the route C3) according to route learning. The IP address of the learned route C3 may be the IP address 3.3.3.3 of the server 3 of the route 33 and the next hop of the learned route C3 may be the IP address 192.168.100.31 of the network card eth31.

The switch D may receive the route 32 and route 34 advertised by the server 3, learn the route to the server 3 (denoted with the route D3) according to route learning. The IP address of the learned route D3 may be the IP address 3.3.3.3 of the server 3 of the route 34 and the next hop of the learned route D3 may be the IP address 192.168.200.32 of the network card eth32.

The switch C may receive the route 41 and route 43 advertised by the server 4, learn the route to the server 4 (denoted with the route C4) according to route learning. The IP address of the learned route C4 may be the IP address 4.4.4.4 of the server 4 of the route 43 and the next hop of the learned route C4 may be the IP address 192.168.100.41 of the network card eth41.

The switch D may receive the route 42 and route 44 advertised by the server 4, learn the route to the server 4 (denoted with the route D4) according to route learning. The IP address of the learned route D4 may be the IP address 4.4.4.4 of the server 4 of the route 44 and the next hop of the learned route D4 may be the IP address 192.168.200.42 of the network card eth42.

In FIG. 4, the switch C may advertise the learned route C3, route C4 and route C0 (i.e., a route to a client 6.1.1.1) to the switch D in the OSPF1 domain. When the switch C advertises the route C3, the switch C may modify the next hop of the route C3 as an IP address of an interface on the switch C connecting to the switch D. Similarly, the switch C also may modify the next hop of the route C4 and route C0 as an IP address of an interface on the switch C connecting to the switch D. The switch D may receive the route C3, route C4 and route C0 advertised by the switch C.

The switch D may advertise the learned route D3, route D4 and route D0 (i.e., a route to a client 5.1.1.1) to the switch C in the OSPF1 domain. When the switch D advertises the route D3, the switch D may modify the next hop of the route D3 as an IP address of an interface on the switch D connecting to the switch C. Similarly, the switch D also may modify the next hop of the route D4 and route D0 as an IP address an interface on the switch D connecting to the switch C. The switch C may receive the route D3, route D4 and route D0 advertised by the switch D.

In FIG. 4, when the switch C advertises the route to the server 3 via the OSPF neighbor connection 31 in the OSPF1 domain, the switch C may advertise the locally-learned route C4, route C0 (i.e., the route to the client 6.1.1.1), the route D4 and the route D0 to the server 3. The route D4 and route D0 may be advertised by the switch D. When the switch C advertises the route C4, the next hop of the route C4 may be modified as an interface IP address of a local interface C31. Similarly, the switch C also may modify the next hop of the route C0, route D4 and the route D0 as the interface IP address of the local interface C31. When the switch D advertises the route to the server 3 via the OSPF neighbor connection 32 in the OSPF1 domain, the switch D may advertise the locally-learned route D4, route D0 (i.e., a route to client 5.1.1.1), the route C4 and route C0 to the server 3. The route C4 and route C0 may be advertised by the switch C. When the switch D advertises the D4, the next hop of the route D4 may be modified as an interface IP address of a local interface D32. Similarly, the switch C also may modify the next hop of the route C0, route C4 and the route C0 as the interface IP address of the local interface D32. Therefore, the server 3 may receive the route information including addresses of other devices sent from the route neighbors of the server 3 via the each local network card.

When the switch C advertise the route to the server 4 via the OSPF neighbor connection 41 in the OSPF1 domain, the switch C may advertise the locally-learned route C3, route C0 (i.e., the route to the client 6.1.1.1), the route D3 and the route D0 to the server 4. The route D3 and route D0 may be advertised by the switch D. When the switch C advertises the route C3, the next hop of the route C3 may be modified as an interface IP address of a local interface C41. Similarly, the switch C also may modify the next hop of the route C0, route D3 and the route D0 as the interface IP address of the local interface C41. When the switch D advertises the route to the server 4 via the OSPF neighbor connection 42 in the OSPF1 domain, the switch D may advertise the locally-learned route D3, route D0 (i.e., a route to client 5.1.1.1), the route C3 and route C0 to the server 4. The route C3 and route C0 may be advertised by the switch C. When the switch D advertises the D3, the next hop of the route D3 may be modified as an interface IP address on a local interface D42. Similarly, the switch D also may modify the next hop of the route D0, route C3 and the route C0 as an interface IP address on the local interface D42. Therefore, the server 4 may receive the route information including addresses of other devices sent from the route neighbors of the server 4 via the each local network card.

Two routes from the server 3 to the server 4 may be configured. The IP addresses of the two routes may be the same, such as may be the IP address 4.4.4.4 of the server 4. Outgoing interfaces of the two routes may be different. One of the outgoing interfaces may be the network card eth31 and the other may be the network card eth32. Two routes from the server 3 to the client 6.1.1.1 may be configured. The IP addresses of the two routes may be the same, such as may be the IP address 6.1.1.1 of the client. Outgoing interfaces of the two routes may be different. One of the outgoing interfaces may be the network card eth31 and the other may be the network card eth32. Two routes from the server 3 to the client 5.1.1.1 may be configured. The IP addresses of the two routes may be the same, such as may be the IP address 5.1.1.1 of the client. Outgoing interfaces of the two routes may be different. One of the outgoing interfaces may be the network card eth31 and the other may be the network card eth32.

Two routes from the server 4 to the server 3 may be configured. The IP addresses of the two routes may be the same, such as may be the IP address 3.3.3.3 of the server 3. Outgoing interfaces of the two routes may be different. One of the outgoing interfaces may be the network card eth41 and the other may be the network card eth42. Two routes from the server 4 to the client 6.1.1.1 may be configured. The IP addresses of the two routes may be the same, such as may be the IP address 6.1.1.1 of the client. Outgoing interfaces of the two routes may be different. One of the outgoing interfaces may be the network card eth41 and the other may be the network card eth42. Two routes from the server 4 to the client 5.1.1.1 may be configured. The IP addresses of the two routes may be the same, such as may be the IP address 5.1.1.1 of the client. Outgoing interfaces of the two routes may be different. One of the outgoing interfaces may be the network card eth41 and the other may be the network card eth42.

In an example, taking the server 3 for example, when the server 3 receives a packet destined for the client 6.1.1.1, the server 3 may select one route, such as a route, the outgoing interface of which may be the network card eth31 and transmit the packet using the selected route.

When the server 3 detects that the link connecting to the eth31 fails, the server 3 may delete the routes, outgoing interfaces of which may be the network card eth31 and delete all route information received from the eth31. The server 3 may not advertise a message indicating deleting the routes, outgoing interfaces of which may be the network card eth31. When detecting that an interface of the switch C connecting to the other switch devices or clients fails, the other switch devices or clients may adaptively adjust the routes, so as not to forward the packet to the failed interface of the switch C. After the interface of the switch C fails, when the server 3 receives another packet destined for the client 6.1.1.1, the server 3 may transmit the packet via the route, the outgoing interface of which may be the network card eth32.

Figure 5:
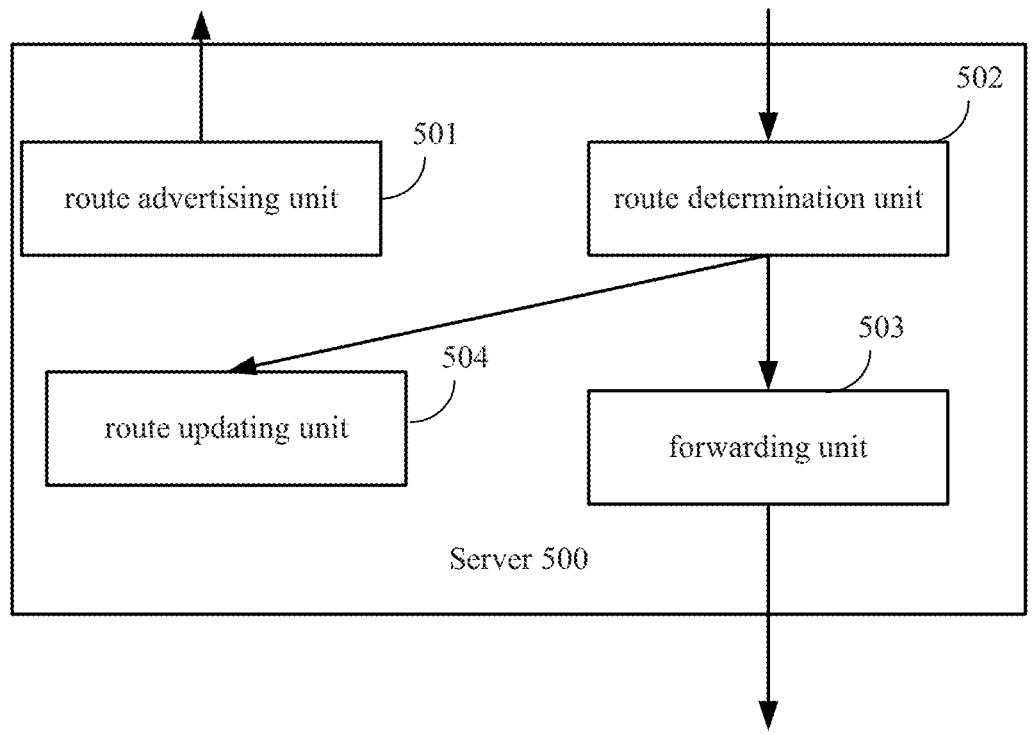
FIG. 5 is a diagram illustrating structure of a server according to an example of the present disclosure.

Referring to FIG. 5, FIG. 5 is a diagram illustrating structure of a server according to an example of the present disclosure. The server may be a server in a cluster and configured with two or more than two network cards. As shown in FIG. 5, the server 500 may include:

a route advertising unit 501, configured to advertise a route, which may include a network segment address of each local network card and an IP address of the server, to a route neighbor via the each local network card;

a route determination unit 502, configured to receive route information, which may include an address of a device, from the route neighbor of the server via the each network card, determine a route from the server to the address of the device, wherein outgoing port of the route may be the network card, the address of the device may include: an IP address of a client or an IP address of another server in the cluster;

a forwarding unit 503, configured to, when a packet destined for the address of the device is received, forward the packet via the route from the server to the address of the device; and a route updating unit 504, configured to, when a link connecting to the network card fails, disable all the routes, the outgoing interfaces of which may be the network card.

In an example, the route updating unit 504 may be further configured to, when the link connecting to the network card fails, delete all the routes, the outgoing interfaces of which may be the network card and delete all route information received via the network card.

In an example, when the route updating unit 504 detects a link connecting to the network card fails, the route updating unit 504 may disable all the routes, the outgoing interfaces of which may be the network card by setting invalid tags for all the routes, the outgoing interfaces of which may be the network card and setting invalid tags for all route information received via the network card.

In an example, the IP address of the server may have a Loopback interface attribute.

In an example, IP addresses of the different local network cards on the server may belong to different network segments, and different local network cards of the server may connect to different route switch devices.

In an example, the route advertising unit 501 may advertise the route to the route neighbor via the each local network card by establishing a BGP neighbor connection between the each local network card and each route switch device connecting to the each local network card, and advertising a network segment route of the each local network card and a route of the IP address of the server to the each BGP neighbor. The route may include a network segment address of the each local network card and the IP address of the server. Wherein, a next hop of the network segment route of the each local network card may be a network card IP address of the each local network card and a next hop of the route of the IP address of the server may be the network card IP address of the each local network card.

The route determination unit 502 may receive route information, which may include the address of the device, from the route neighbor of the server via the each network card by receiving a BGP route advertised by the each BGP neighbor connecting to the each network card.

The route advertising unit 501 may advertise the route to the route neighbor via the each local network card by establishing an OSPF neighbor connection from the each local network card to each route switch device connecting to the each local network card, and advertising a network segment route of the each local network card and a route of the IP address of the server to each OSPF neighbor. The route may include a network segment address of the each local network card and the IP address of the server. A next hop of the network segment route of the each local network card may be a network card IP address of the each local network card and a next hop of the route of the IP address of the server may be the network card IP address of the each local network card.

The route determination unit 502 may receive route information, which may include the address of the device, from the route neighbor of the server via the each network card by receiving a route advertised by the each OSPF neighbor connecting to the each local network card.

Figure 6:
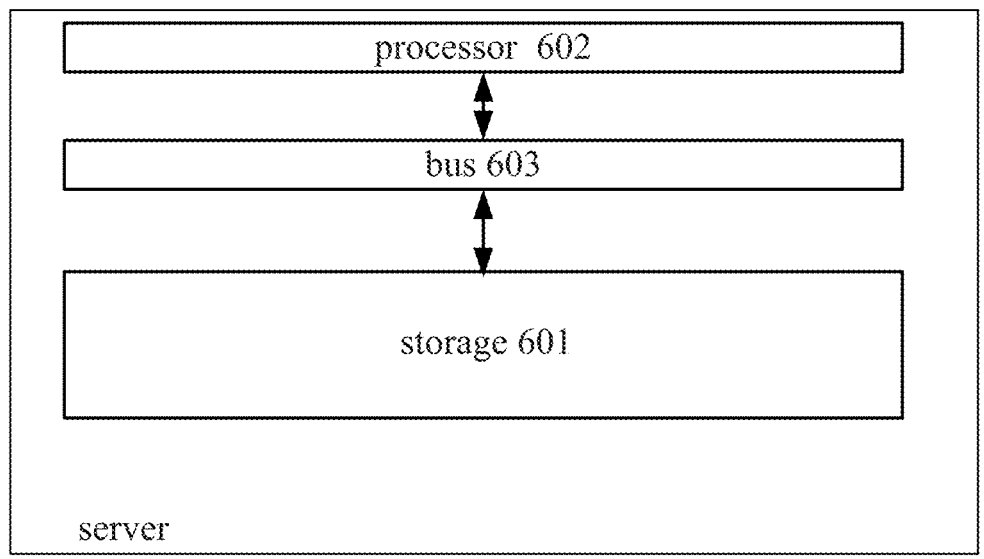
FIG. 6 is a diagram illustrating structure of a server according to an example of the present disclosure.

FIG. 6 is a schematic diagram illustrating structure of a server according to an example of the present disclosure. The server may include: a storage 601, a processor 602 and a bus 603.

The storage 601 may be configured to store machine readable instructions.

The processor 602, such as CPU, may be configured to execute the machine readable instructions in the storage 601. The machine-readable instructions may be executed by the processor 602 to:

advertise a route, which may include a network segment address of each local network card and an IP address of the server, to a route neighbor of the server via the each local network card;

receive route information, which may include an address of a device, from the route neighbor of the server via the each network card, determine a route from the server to the device, wherein an outgoing port of the route may be the each network card, the address of the device may include: an IP address of a client or an IP address of another server in the cluster;

when a packet destined for the address of the device is received, forward the packet via the route from the server to the address of the device;

when a link connecting to a network card fails, disable all the routes, outgoing interfaces of which may be the network card.

In an example, the IP address of the server may have a Loopback interface attribute, different local network cards of the server may connect to different route switch devices, and IP addresses of different network cards on the server may belong to different network segments.

In an example, the machine-readable instructions may be executed by the processor 602 to:

establish a BGP neighbor connection between the each network card and a route switch device connecting to the each network card;

advertise a network segment route of the each network card and a route of the IP address of the server to a BGP neighbor of the each network card; wherein a next hop of the network segment route of the each network card may be a network card IP address of the each network card and a next hop of the route of the IP address of the server may be the network card IP address of the each network card.

In an example, the machine-readable instructions may be executed by the processor 602 to: receive a BGP route advertised by the BGP neighbor of the each network card.

In an example, the machine-readable instructions may be executed by the processor 602 to:

establish an OSPF neighbor connection from the each network card to a route switch device connecting to the each network card;

advertise a network segment route of the each network card and a route of the IP address of the server to an OSPF neighbor, wherein a next hop of the network segment route of the each network card may be a network card IP address of the each network card and a next hop of the route of the IP address of the server may be the network card IP address of the each network card.

In an example, the machine readable instructions may be executed by the processor 602 to: receive a route advertised by the OSPF neighbor connecting to the each network card.

In an example, the machine readable instructions may be executed by the processor 602 to: set invalid tags for all the routes, the outgoing interfaces of which may be the each network card, and set invalid tags for all route information received via the each network card.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for implementing a cluster, applied to a server in a cluster, wherein the server is configured with two or more than two network cards, the method comprises:

advertising a route, which comprises a network segment address of each local network card and an IP address of the server, to a route neighbor of the server via the each local network card;

receiving route information, which comprises an address of a device, from the route neighbor of the server via the each network card, determining a route from the server to the device, wherein an outgoing port of the route is the each network card, the address of the device comprises: an IP address of a client or an IP address of another server in the cluster;

when a packet destined for the address of the device is received, forwarding the packet via the route from the server to the address of the device;

when a link connecting to a network card fails, disabling all routes, outgoing interfaces of which are the network card.

2. The method according to claim 1, wherein the IP address of the server has a Loopback interface attribute.

3. The method according to claim 1, wherein different network cards on the server connect to different route switch devices, and IP addresses of different network cards on the server belong to different network segments.

4. The method according to claim 1, wherein advertising the route, which comprises the network segment address of the each local network card and the IP address of the server, to the route neighbor via the each local network card comprises:

establishing a BGP neighbor connection between the each network card and a route switch device connecting to the each network card;

advertising a network segment route of the each network card and a route of the IP address of the server to a BGP neighbor of the each network card; wherein a next hop of the network segment route of the each network card is a network card IP address of the each network card and a next hop of the route of the IP address of the server is the network card IP address of the each network card.

5. The method according to claim 4, wherein receiving the route information, which comprises the address of the device, from the route neighbor of the server via the each network card comprises:

receiving a BGP route advertised by the BGP neighbor of the each network card.

6. The method according to claim 1, wherein advertising the route, which comprises the network segment address of the each local network card and the IP address of the server, to the route neighbor via the each local network card comprises:
   establishing an OSPF neighbor connection from the each network card to a route switch device connecting to the each network card;
   advertising a network segment route of the each network card and a route of the IP address of the server to an OSPF neighbor; wherein
   a next hop of the network segment route of the each network card is a network card IP address of the each network card and a next hop of the route of the IP address of the server is the network card IP address of the each network card.

7. The method according to claim 6, wherein receiving the route information, which comprises the address of the device, from the route neighbor of the server via the each network card comprises:
   receiving a route advertised by the OSPF neighbor connecting to the each network card.

8. The method according to claim 1, wherein disabling all the routes, the outgoing interfaces of which are the each network card, comprises: deleting all the routes, the outgoing interfaces of which are the each network card and deleting all route information received via the each network card.

9. A server, applied to a server in a cluster, wherein the server is configured with two or more than two network cards and the server comprises: a processor and a non-transitory storage medium storing machine-readable instructions, which are executed by the processor to
   advertise a route, which comprises a network segment address of each local network card and an IP address of the server, to a route neighbor of the server via the each local network card;
   receive route information, which comprises an address of a device, from the route neighbor of the server via the each network card, determine a route from the server to the device, wherein an outgoing port of the route is the each network card, the address of the device comprises: an IP address of a client or an IP address of another server in the cluster;
   when a packet destined for the address of the device is received, forward the packet via the route from the server to the address of the device;
   when a link connecting to a network card fails, disable all routes, outgoing interfaces of which are the network card.

10. The server according to claim 9, wherein the IP address of the server has a Loopback interface attribute, different network cards on the server connect to different route switch devices, and IP addresses of different network cards on the server belong to different network segments.

11. The server according to claim 9, wherein the machine-readable instructions are executed by the processor to:
   establish a BGP neighbor connection between the each network card and a route switch device connecting to the each network card;
   advertise a network segment route of the each network card and a route of the IP address of the server to a BGP neighbor of the each network card; wherein
   a next hop of the network segment route of the each network card is a network card IP address of the each network card and a next hop of the route of the IP address of the server is the network card IP address of the each network card.

12. The server according to claim 11, wherein the machine-readable instructions are executed by the processor to:
   receive a BGP route advertised by the BGP neighbor of the each network card.

13. The server according to claim 9, wherein the machine-readable instructions are executed by the processor to:
   establish an OSPF neighbor connection from the each network card to a route switch device connecting to the each network card;
   advertise a network segment route of the each network card and a route of the IP address of the server to an OSPF neighbor, wherein
   a next hop of the network segment route of the each network card is a network card IP address of the each network card and a next hop of the route of the IP address of the server is the network card IP address of the each network card.

14. The server according to claim 13, wherein the machine-readable instructions are executed by the processor to:
   receive a route advertised by the OSPF neighbor connecting to the each network card.

15. The server according to claim 9, wherein the machine-readable instructions are executed by the processor to:
   set invalid tags for all the routes, the outgoing interfaces of which are the each network card, and set invalid tags for all route information received via the each network card.

* * * * *